Figures 1, 2:
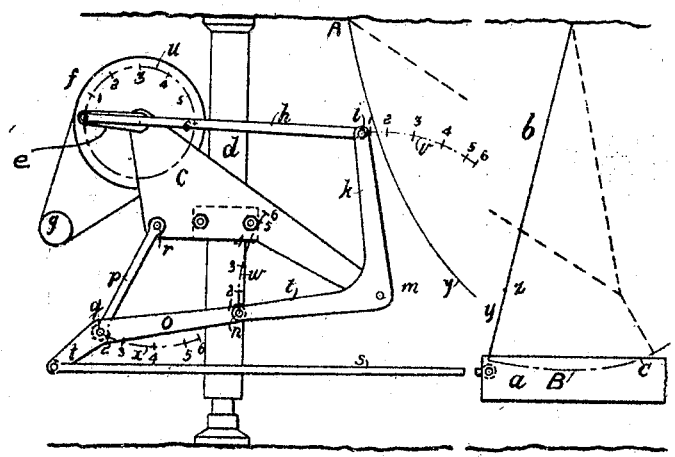

Jan. 2, 1923.

S. NETTLETON.
ACTUATING MECHANISM FOR RECIPROCATING TROUGH CONVEYERS.
FILED JULY 14, 1921.

1,441,108

Inventor
Stanley Nettleton
by Wilkinson & Fiusta
Attorneys.

Patented Jan. 2, 1923.

1,441,108

UNITED STATES PATENT OFFICE.

STANLEY NETTLETON, OF LONDON, ENGLAND.

ACTUATING MECHANISM FOR RECIPROCATING TROUGH CONVEYERS.

Application filed July 14, 1921. Serial No. 484,670.

(GRANTED UNDER THE PROVISIONS OF THE ACT OF MARCH 3, 1921, 41 STAT. L., 1313.)

*To all whom it may concern:*

Be it known that I, STANLEY NETTLETON, a subject of the King of Great Britain, and resident of London, England, have invented certain new and useful Improvements in Actuating Mechanism for Reciprocating Trough Conveyers (for which I made application for Letters Patent in Great Britain July 5, 1917, which has since become patented as No. 114085), of which the following is a specification.

The present invention relates to actuating mechanism for reciprocating trough conveyers.

The object is to provide a novel mechanism, and one suitable for actuating a stop conveyer, by which harmonic motion due to a crank is converted by link mechanism to cause the velocity of the trough on the forward stroke to be increased gradually to the maximum near to the end of the stroke and then rapidly fall to zero, the operation being reversed on the return stroke.

The mechanism is shown in side elevation in Figure 1. of the accompanying drawings.

Figure 2. is an illustrative diagram.

$a$ indicates a trough suspended by chains $b$ or carried by rollers or any other suitable means which permit of longitudinal reciprocation. $c$ is a frame for the actuating mechanism, shown mounted on a column $d$. $e$ is a crank mounted on the frame $c$ and fast with a sprocket $f$ which is driven by a motor $g$.

If the crank $e$ were connected directly to the conveyer by a connecting rod such as $h$ or $s$ the motion of the conveyer would be approximately harmonic; link mechanism is accordingly introduced between the crank and the trough such as to vary the harmonic motion by increasing or decreasing it at the desired points.

$o$ is a rod guided at its point $q$ for movement in substantially horizontal path and in the direction of the trough's movement, as by a link $p$ pivoted to the rod $o$ at $q$ and to the frame $c$ at $r$. The other end of the rod is reciprocated by suitable connections from the crank $e$, to move in a substantially vertical path, as by a lever arm $l$ pivoted to the frame at $m$.

The rod $o$ is, at the beginning of the forward stroke, substantially radial to the lever $l$ and therefore receives little effective movement therefrom. As the stroke continues the rod $o$ comes more at right angles to the arm $l$ and the velocity of its point $q$ is therefore accelerated relatively to the angular velocity of the lever $l$.

The trough $a$ may be joined by a connecting rod $s$ directly to said point $q$ or may be preferably joined to a downwardly directed extension $t$ of the rod $o$. For reciprocating the lever $l$ the latter forms one arm of a bell crank $l$ $k$ of which the point $i$, is joined to the crank $e$ by a connecting rod $h$. The desired modification of the motion is partly obtained in this arrangement by so arranging the rod $h$ and arm $k$, that at the beginning of the stroke they are approximately at right angles and therefore the angular velocity of the bell crank due to a given linear velocity of the connection rod is a minimum. As the stroke progresses the arm $k$ becomes more oblique to the connecting rod $h$ and the relative angular velocity of the bell crank is increased. The obliquity 5 of the connecting rod $h$ assists this modification of the motion in the known manner.

The path of the pin of the crank $e$ is indicated by the circle $u$. The path of the points $i$, $n$ and $q$ are indicated by the arcs $v$, $w$, $x$. The path of the crank pin on the forward stroke is shown divided into six equal parts by the points numbered 1 to 6. Similarly numbered points on the other paths $v$, $w$, $x$ show the corresponding position of the points $i$, $n$, $q$; and the retardation and acceleration which occur in the initial and latter periods of the forward stroke. The movements during the return stroke are substantially the reverse of those during the forward stroke.

In Figure 2 the dotted line A shows the curve of harmonic motion produced by connecting the conveyer direct to the crank through an ordinary connecting rod. The full line B shows the curve of motion produced by the apparatus according to this invention. The line C.D represents periods of time in the cycle of movement, and the height of the curves from line C.D represents the amount of movement of the conveyer. It will be seen that the point of maximum velocity is moved from the centre towards the end of the stroke.

What I claim is:

Actuating mechanism for reciprocating trough conveyers comprising in combination, a crank, means for actuating said crank, a conveyer trough mounted for longitudinal reciprocation, a fixed frame, a link pivoted to and suspended from said frame, the lower end of said link being in substantially the same horizontal plane as said conveyer trough, a horizontally disposed rod pivoted to said link, means for connecting one end of said rod to said conveyer trough, and a bell crank lever pivoted to said frame and having one arm pivoted to the free end of said rod, and the other arm operated by said crank, substantially as described.

In witness whereof I affix my signature.

STANLEY NETTLETON.